Patented Oct. 6, 1942

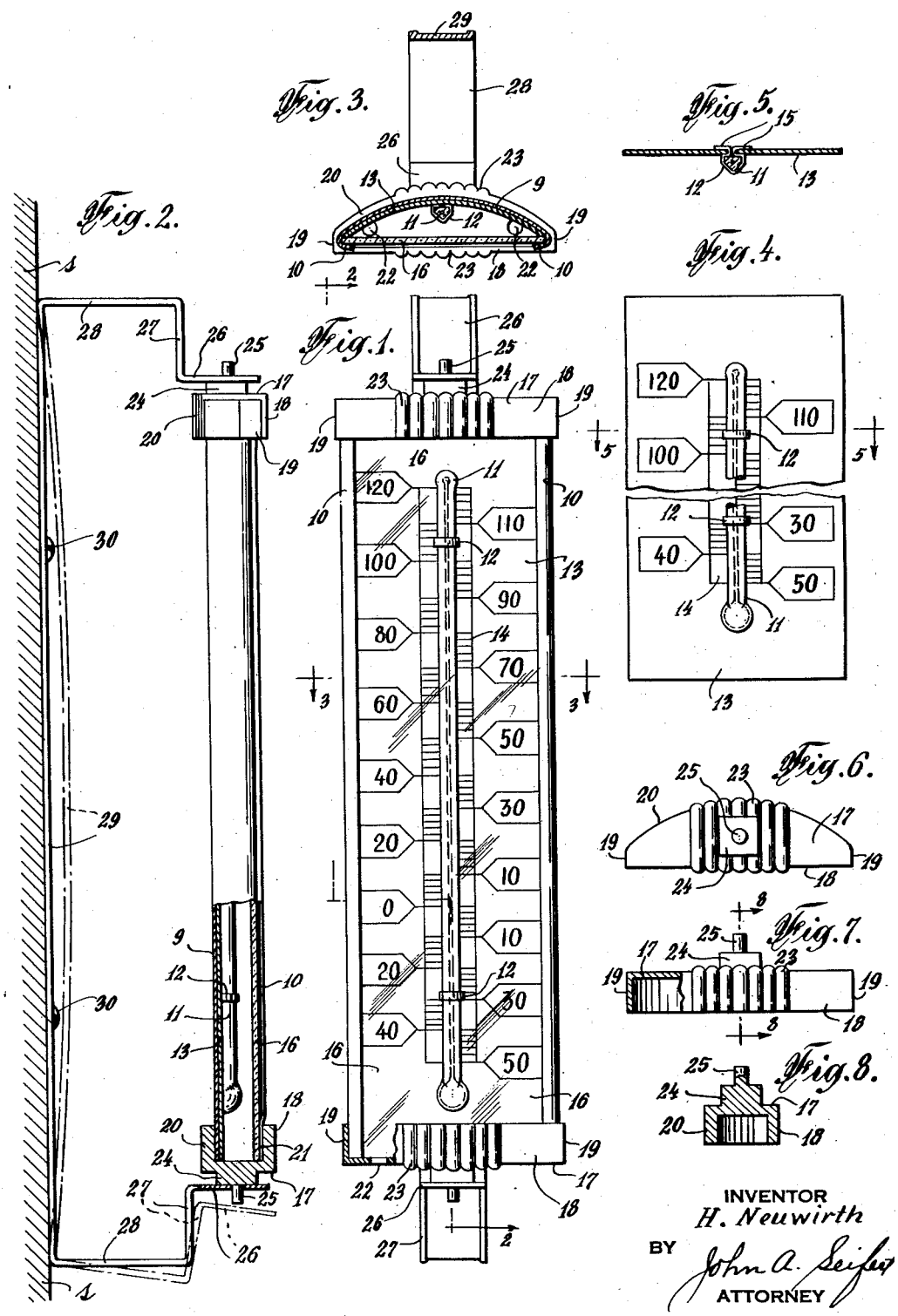

2,297,792

UNITED STATES PATENT OFFICE 2,297,792

THERMOMETER

Herman Neuwirth, Brooklyn, N. Y., assignor to Testrite Instrument Company, Inc., New York, N. Y., a corporation of New York Application August 1, 1941, Serial No. 405,004

7 Claims. (Cl. 73—378)

This invention relates to thermometers and particularly to thermometers used outdoors and adapted to be mounted adjacent to a window or door.

The principal object of the invention is to provide a cheap and efficient thermometer, which may be readily assembled and the parts readily replaced.

Another object of the invention is to provide and arrange the parts whereby said parts in assembled condition form a weather-proof housing for a scale member and thermometer tube without the use of washers or gaskets.

A further object of the invention is to provide the scale member with a readily readable scale and mount said scale member in a housing in a manner whereby the scale may readily be read.

It is a further object of the invention to provide a plate having opposed channels at the opposite sides thereof, a flexible scale member having a thermometer tube mounted thereon relative to the scale and said scale member engaged on a face of the plate with side edges of the scale member within the channels of the plate, a transparent panel having the side portions engaged in the channels of the plate and covering the scale member and thermometer tube, and a pair of cap members engaged on the opposite ends of the plate to form with the plate and transparent panel a housing for the scale member and thermometer tube.

Other objects and advantages of the invention will be set forth in the detail description thereof.

In the drawing accompanying and forming a part of the application, Figure 1 is a front elevational view of a thermometer forming the embodiment of the present invention with a portion of a cap member in section to show a vent opening.

Figure 2 is a side elevational view of the thermometer with the lower portion thereof in section taken on the line 2—2 of Figure 1 looking in the direction of the arrows.

Figure 3 is a cross sectonal view of the thermometer taken on the line 3—3 of Figure 1 looking in the direction of the arrows.

Figure 4 is a front elevational view of a scale member having a thermometer tube mounted thereon with an intermediate portion of the member and tube broken away.

Figure 5 is a cross sectional view of the scale member and thermometer tube taken on the line 5—5 of Figure 4 looking in the direction of the arrows.

Figure 6 is a top plan view of a cap member.

Figure 7 is a front elevational view of the cap member with a section of the front flange portion broken away and the adjacent portions of the cap member in section.

Figure 8 is a sectional view of the cap member taken on the line 8—8 of Figure 7 looking in the direction of the arrows.

In carrying out the embodiment of the invention shown in the accompanying drawing, there is provided a rectangular plate 9 of sheet metal or other suitable material having opposed channels formed in the opposite side portions thereof by flanging said opposite side portions inwardly to extend over and in spaced relation to a face of the plate, as shown at 10. In the present illustration of the invention, the plate is of arcuate shape in cross section with the flanges 10 extending over the concave face of the plate. The plate may be straight in cross section without affecting the invention.

The concave face or the face having the flanges 10 extending thereover of the plate 9 is adapted to support a thermometer tube 11 of usual construction. In the present illustration of the invention, the thermometer tube is mounted by spaced clips 12 on a scale member comprising a rectangular sheet 13 of flexible material, such as metal, cardboard, fibre or the like, having graduations or markings in degrees of temperature on a face thereof, as shown at 14. The thermometer tube is mounted on the scale member to extend longitudinally and centrally of the graduations 14, and the clips 12 comprise metal bands having the middle portion engaging the thermometer tube and the end portions extended through a pair of spaced openings on the opposite sides of the longitudinal center of the graduations and bent laterally in opposite directions over the back of the scale member, as shown at 15 in Figure 5. The scale member is of approximately the same length as the plate 9 but of less width, so that the scale member is engaged on the concave face of the plate with the opposite side edges within the channels formed by the plate flanges 10 and the graduations and thermometer tube exposed, as clearly shown in Figure 3.

The thermometer tube may be mounted directly on the concave face of the plate 9 by the clips 12 and the concave face of said plate arranged with the graduations 14.

The graduated face 14 and the thermometer tube 11 are protected from the weather by a transparent panel 16 of suitable material, such as glass, and in the present instance flat in cross section, having the opposite side portions or margins engaged in the channels formed by the flanges 10 of the plate 9 by sliding the panel into one end of the channels with the opposite side edges of the scale member engaging the under surface or back of the panel. The engagement of the panel with the scale member will retard the scale member against longitudinal movement and urge the panel against the flanges 10, as shown in Figure 3. When the scale graduations 14 are placed directly on the concave face of the plate 9 and the thermometer tube 11 mounted on said plate, the transparent panel 16 should be of greater thickness to occupy more fully the channels formed by the flanges 10. The panel 16 will be of arcuate form in cross section when the plate 9 is straight in cross section.

The glass panel and scale member are retained on the plate and the plate is prevented from spreading by a pair of cap members 17 having a front flange portion 18 extending in a straight plane perpendicularly of the top and terminating in straight end flange portions 19 leading to an arcuate rear flange portion 20, as shown in Figure 6. The form of the flange portions 18, 19 and 20 permits the cap members 17 to be readily engaged on the opposite ends of the plate 9 with the straight front portion 18 engaging the flanges 10 and extending over the exposed front face of the transparent panel 16 and the end portions 19 engaging the juncture of the flanges 10 with the arcuate body of the plate 9 and the rear portion 20 engaging the convex face of the plate 9, as shown in Figure 3. The cap members 17 engaged on the plate 9 form with said plate and the transparent panel 16 a housing enclosing the scale graduations 14 and the thermometer tube 11. The opposite end portions of the flanges 10 are flattened against the glass panel 16, as shown at 21 in Figure 2, to form a tight seal between the cap members and the glass panel and prevent moisture from seeping into the housing and injuring the scale member or graduations. The cap member 17 engaged on the end of the plate adjacent to the bulb end of the thermometer tube is arranged with openings 22 to permit atmospheric air to enter the housing and drainage of possible moisture from the housing. To enhance the appearance of the thermometer and strengthen the cap members, said members are arranged with a thickened portion extending transversely and centrally thereof having the outer surface serrated, as shown at 23. When the plate 9 is flat in cross section and the glass panel 16 is arcuate in cross section, the cap members 17 are engaged on the opposite ends of the plate and panel with the flange portions 18 engaging the plate 9 and the flange portion 20 engaging the panel 16.

The thermometer is adapted to be mounted in a vertical position with the bulb portion of the thermometer tube lowermost and the thermometer extending in parallel spaced relation to a vertical support s, such as a door or window frame, by arranging the cap members with a boss 24 integral with and extending perpendicularly from the center of the top of the thickened portion 23 and arranged with a center pintle 25 adapted to be engaged in alined openings in horizontally extending extremities 26 of vertical portions 27 of horizontally extending arms 28 of a vertically connecting portion 29 of a bracket of resilient material, such as spring steel, said connecting portion 29 having spaced openings for the engagement of screws or nails secured in the vertical support s, as shown at 30. In mounting the thermometer in the bracket arms 28, the lower arm 28 is moved to a downwardly extending position by flexing the connecting portion 29 inwardly before said portion 29 is attached to the support s, as shown in dot and dash lines in Figure 2. When the pintles 25 are engaged in the openings in the arm extremities 26 and the portion 29 is attached to the support s, the inherent tension of the bracket will clamp the thermometer between the arm extremities 26 while permitting the thermometer to be rotated between said extremities to any desired position, as relative to a door or window.

Having thus described my invention, I claim:

1. In a thermometer, a rectangular plate arcuate in cross section having the opposite side portions flanged inwardly to extend in spaced relation to a face of the plate, a thermometer tube mounted on said face of the plate, a transparent panel having the opposite marginal portions engaged within the flanged portions of the plate and the panel extending transversely of the plate and the thermometer tube, and a pair of cap members engaged on the opposite ends of the plate with the cap flanges extending over the plate flanges and the panel to retain the transparent panel against longitudinal movement relative to the plate and prevent spreading of the plate flanges and form with the transparent panel and plate an enclosing housing for the thermometer tube, one of said cap members having openings therein for the admission of atmospheric air to the thermometer tube.

2. In a thermometer as claimed in claim 1, pintles arranged on the cap members, and a supporting bracket of resilient material having at the opposite ends laterally extending arms arranged with openings for the rotary engagement of the pintles to support the assembled thermometer and said bracket adapted to be flexed to move the lateral arms from each other and permit the engagement of the pintles in said openings.

3. In a thermometer, a plate of arcuate shape in cross section having the opposite side portions flanged inwardly to extend in spaced relation to the concave face of the plate, a scale member of flexible material engaged on the concave face of the plate with the side edges within the plate flanges, a thermometer tube mounted on the scale member relative to the scale thereon, a transparent panel having the opposite marginal portions engaged within the flanged portions of the plate and abutting the side edges of the scale member, the resiliency of said scale member retaining the panel against the plate flanges, and a pair of cap members fitting over the ends of said plate, scale member and transparent panel and having a straight flange portion to engage the plate flanges and extend over the transparent panel and an opposite arcuate flange portion to engage the convex face of the plate, said cap members retaining the scale member and transparent panel against longitudinal movement relative to the plate and prevent spreading out of the plate.

4. In a thermometer as claimed in claim 3, a pintle integral with and extending from the top of each cap member, and a supporting bracket of resilient material adapted to be mounted on a supporting surface and having laterally extending arms arranged with alined openings for the engagement of the pintles to support the assembled thermometer, the bracket being adapted to be flexed to move the lateral arms from each other and permit engagement of the pintles in said openings 5. In a thermometer as claimed in claim 3, means to support the assembled thermometer in vertical position, and the lower cap member arranged with openings for the admission of atmospheric air to the thermometer tube and permit moisture to escape from the chamber formed by the plate, transparent panel and the cap members.

6. A thermometer as claimed in claim 3, wherein the opposite end portions of the plate flanges engaged by the flanges of the cap members are pressed flat against the panel to form a tight seal between the cap flanges and the panel.

7. In a thermometer, a rectangular plate arcuate in cross section having opposed channels at the opposite sides thereof, a sheet of flexible material having a thermometer scale on a face thereof engaged on a face of the plate with the scale exposed and the side edges of the sheet within the plate channels, a thermometer tube mounted on the scale face of the sheet in position relative to the scale, a transparent panel having the side portions slidably engaged within and positioned by the plate channels to cover the exposed scale face of the sheet and the thermometer tube thereon, and a pair of cap members engaged on the opposite ends of the plate with the flange of the cap members engaging the opposite end portions of the plate channels and extending over the transparent panel.

HERMAN NEUWIRTH.